United States Patent
Asai et al.

(10) Patent No.: US 6,450,561 B2
(45) Date of Patent: Sep. 17, 2002

(54) ATTACHMENT DEVICES

(75) Inventors: Takashi Asai, Toyota (JP); Yoshihiro Takabatake, Aichi-ken (JP)

(73) Assignee: Neo-Ex Lab, Inc., Toyota (JP)

( * ) Notice: Subject to any disclaimer, the term of this patent is extended or adjusted under 35 U.S.C. 154(b) by 0 days.

(21) Appl. No.: 09/852,055

(22) Filed: May 10, 2001

(30) Foreign Application Priority Data

May 11, 2000 (JP) ........................................ 2000-138933
Dec. 27, 2000 (JP) ........................................ 2000-399575

(51) Int. Cl.$^7$ ................................................ B60J 3/00
(52) U.S. Cl. .................... 296/97.9; 396/97.13; 396/214
(58) Field of Search .............................. 296/97.9, 97.6, 296/97.13, 97.12; 224/312; 248/215; 439/248

(56) References Cited

U.S. PATENT DOCUMENTS

| | | | | |
|---|---|---|---|---|
| 5,201,564 A | * | 4/1993 | Price ........................ | 396/97.9 |
| 5,711,571 A | * | 1/1998 | Renahy et al. .......... | 396/97.13 |
| 5,765,896 A | * | 6/1998 | Grisval .................... | 296/97.9 |
| 5,918,927 A | * | 7/1999 | Renahy et al. .......... | 296/97.9 |
| 5,975,617 A | * | 11/1999 | Jacquemin et al. ...... | 296/97.9 |
| 6,079,685 A | * | 6/2000 | Jacquemin ............... | 296/97.13 |
| 6,220,645 B1 | * | 4/2001 | Jacquemin ................ | 296/97.9 |
| 6,231,109 B1 | * | 5/2001 | Beaver ..................... | 296/97.9 |
| 6,322,126 B1 | * | 11/2001 | Kraus ....................... | 296/97.9 |
| 6,324,732 B1 | * | 12/2001 | Arisaka et al. ............ | 296/97.9 |
| 6,336,672 B2 | * | 1/2002 | Beaver ..................... | 296/97.9 |
| 6,354,843 B1 | * | 3/2002 | Kato ......................... | 439/248 |
| 2001/0007394 A1 | * | 7/2001 | Beaver ..................... | 296/97.9 |
| 2001/0042999 A1 | * | 11/2001 | Asai ......................... | 296/214 |
| 2002/0017800 A1 | * | 2/2002 | Ichikawa et al. ......... | 296/97.9 |

FOREIGN PATENT DOCUMENTS

| | | | |
|---|---|---|---|
| DE | 43 33 494 | * | 4/1994 |
| JP | 4 110224 | * | 4/1992 |
| JP | 2000 85352 | * | 3/2000 |
| JP | 2000 346015 | * | 12/2000 |
| JP | 2001 322430 | * | 11/2001 |

* cited by examiner

Primary Examiner—Kiran Patel
(74) Attorney, Agent, or Firm—Dennison, Schultz & Dougherty

(57) ABSTRACT

Attachment devices (10) may include a base portion (22) comprising a base body (25) and an upper flat surface (25a). A holder portion (21) may extend from a first end of a first arched attachment part (31) and may include a base plate (24) having an upper flat surface (24a) extending substantially perpendicularly from the first attachment part (31). A first end of a second arched attachment part (32) may extend from the upper flat surface (25a). Further, a second end of the first arched attachment part (31) may be flexibly joined and folded relative to a second end of the second arched attachment part (32) at a hinge portion (11). In the folded state, the holder portion (21) may be disposed within a space defined within the base portion (22).

31 Claims, 10 Drawing Sheets

ATTACHMENT DEVICES

BACKGROUND OF THE INVENTION

1. Field of the Invention

The present invention relates to attachment devices that can easily engage and disengage panels, e.g., roof panels, front header panels and other vehicle body panels. More particularly, the present invention relates to attachment devices that can be reversibly attached to the vehicle panel in order to secure accessory members, such as a sun visor holder, to the vehicle panel. These attachment devices also may be combined with accessory members or accessory member units, e.g., a sun visor holder unit.

2. Description of the Related Art

Several accessory members are typically attached to a vehicle body panel, such as a sun visor holder that is adapted to releasably receive and rotatably hold a support arm of a sun visor. Such sun visor holders have been attached to the vehicle body panel using known attachment devices, such as screws, engagement clips or other such fasteners.

If a screw is used to reversibly attach the sun visor holder to a metal vehicle body, the screw fastening operation requires special tools, and as a result, requires time consuming and labor intensive work. On the other hand, using a clip to attach the sun visor holder to the vehicle body permits easy attachment, because the clip can be easily and advantageously secured to the body panel by simply inserting and snap fitting the clip into an attachment or mounting hole formed in the panel. However, it is usually difficult to remove known clips from the attachment hole after the clip has engaged the attachment hole. As a result, time consuming and labor intensive work is required to remove the sun visor holder from the panel. In fact, if it is impossible to access the engaged clip from an outer or visible side of the body panel, the engaged clip can not be removed from the attachment hole.

SUMMARY OF THE INVENTION

It is, accordingly, one object of the present teachings to teach improved attachment devices that overcome one or more problems of the known attaching devices. For example, in one embodiment of the present teachings, attachment devices are taught that can be easily attached to or removed from a panel.

In another embodiment of the present teachings, a sun visor holder may be integrally formed with such improved attachment devices.

In another aspect of the present teachings, attachment devices may be adapted to attach an accessory member (portion) to a panel and may include an attachment member or engaging means that may elastically engage an attachment or mounting hole formed in the panel. A manipulating member or means is preferably connected or coupled to the attachment member or engaging means. The manipulating member preferably actuates the attachment member or engaging means in order to disengage or remove the attachment device from the mounting hole. As a result, the accessory member can be easily attached to the vehicle panel by simply pressing the attachment member or engagement means into the mounting hole. In addition, the accessory member can be easily disengaged from the vehicle panel by simply operating the manipulating member.

Preferably, the engaging means and the manipulating means are integrally formed from a resin material. Thus, a single part can be manufactured, for example by injection molding, and folded in order to form the present attachment devices.

Such attachment devices can be attached to a vehicle panel in one simple operation by pressing the engaging means into the mounting hole of the vehicle panel. Also, the attachment devices can be removed from the vehicle panel in one simple operation by operating the manipulating member or means.

Thus, the present attachment devices are an improvement over known attachment devices, because the present attachment devices can be easily and quickly attached to and detached from the vehicle panel. In particular, the present attachment devices can minimize manual labor required to install or remove the vehicle accessory, e.g., a sun visor holder.

Additional objects, features and advantages of the present invention will be readily understood after reading the following detailed description together with the accompanying drawings and the claims.

DETAILED DESCRIPTION OF THE INVENTIONS

Figure 1:
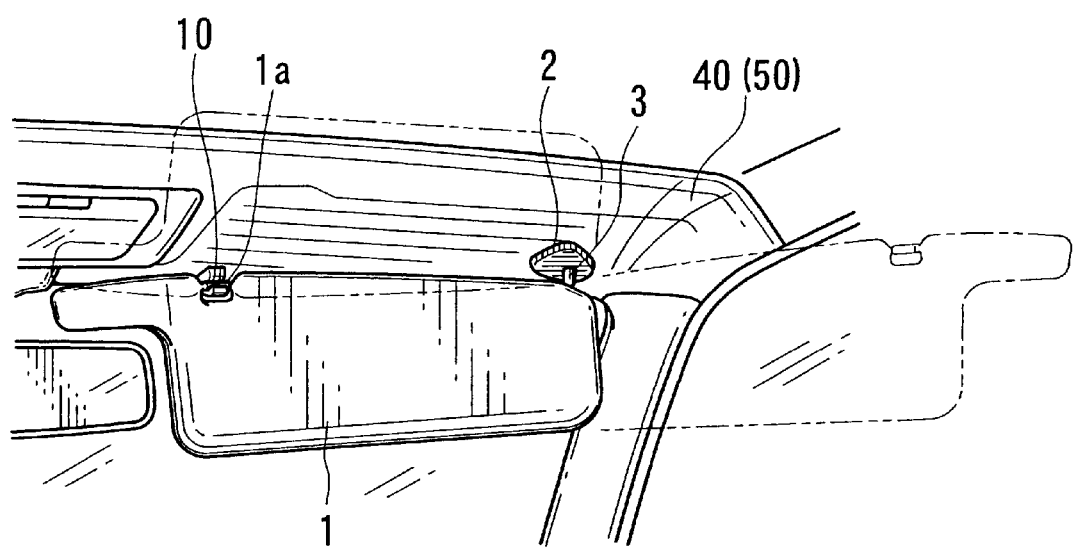
FIG. 1 is a perspective view of a representative sun visor that is attached to a front header panel by an attachment device (e.g. a sun visor holder unit) according to the present teachings.

Attachment devices are generally taught that may include an attachment member (portion) or engagement means that is adapted to elastically engage a mounting hole formed in the panel when it is received therein, and a manipulating member or means that is connected to the attachment member. The manipulating member or means is adapted to actuate the attachment member, so as to disengage the attachment member from the mounting hole. Although the present attachment devices are not limited to any particular use or application, the attachment devices may preferably be utilized to attach an accessory member, e.g., a sun visor holder, to a vehicle panel. Moreover, the present attachment devices are preferably combined with the vehicle accessory.

The attachment member may preferably include first and second attachment parts that are elastically connected each other. These attachment parts may be deformed relative to each other by operating the manipulating member. By such operation, the attachment member can be disengaged from the mounting hole. The manipulating member may preferably include first and second manipulating parts that are separate from each other and are operatively connected to the first and second attachment parts, respectively. The attachment parts can be deformed relative to each other by moving or operating these manipulating parts.

Attachment devices may optionally include a strut plate that is arranged between the first and second manipulating parts. The strut plate may be adapted to prevent relative motion of the manipulating parts, which will thereby prevent relative deformation of the attachment parts after the attachment member is received within the mounting hole. The strut plate may preferably travel or move from a non-functional position to a functional position. As a result, the strut plate may prevent the relative movement of the manipulating parts when the strut plate is shifted to or placed in the functional position.

In other preferred aspects of the present teachings, attachment devices according to any of the embodiments described above and below may be designed as a sun visor holder unit. The manipulating member may be preferably designed as a holder member that is adapted to receive a sun visor retainer portion. The holder member may preferably include a base part and a holding part that are separate from each other and are operatively connected to the first and second attachment parts, respectively. By moving the base part relative to the holding part, the attachment parts will deform in order to permit the attachment device to be removed from the attachment or mounting hole.

In another aspect of the present teachings, attachment devices preferably have a substantially elongated, flexible, resin body. The resin body may include, for example, a base portion comprising a base body having a substantially U-shape. Further, an upper flat surface, one or more side walls and a front wall may be provided within the base portion and a space may be defined between the side wall(s) and the front wall. The resin body may also include a first arched attachment part having a first end and a second end. A holder portion may extend from the first end of the first arched attachment part. The holder portion may include a base plate having an upper flat surface that extends substantially perpendicularly from the first attachment part. The resin body may further include a second arched attachment part also having a first end and a second end. The first end of the second arched attachment part may extend from the upper flat surface of the base portion. Further, the second end of the first arched attachment part and the second end of the second arched attachment part may be flexibly joined at a hinge portion. When the first arched attachment part and the second arched attachment part are folded along the hinge portion, the holder portion is preferably disposed within the space defined in the base portion. Moreover, inward movement of the holder portion relative to the base portion preferably causes the first arched attachment part to flex or deform (move) inwardly relative to the second arched attachment part. Mating surfaces optionally may be defined on the respective inner surfaces of the first and second arched attachment parts. The respective mating surfaces preferably contact each other when the first arched attachment part and the second arched attachment part are folded along the hinge portion and are inwardly pressed. In addition, a first engagement projection optionally may be disposed on the outer surface of the first arched attachment part and a second engagement projection optionally may be disposed on the outer surface of the second arched attachment part. The second engagement projection may preferably be cantilevered. One or more stopper bars optionally may be disposed on the upper surface of the base portion. In further preferred embodiments of the present teachings, a cantilever strut plate may extend from an inner surface of the holder portion. Further, an engagement projection may extend from the strut plate and a groove may be defined within the base portion. Engagement of the engagement projection within the groove may retain or releasably lock the strut plate in a functional position. Moreover, if the attachment device is utilized as a sun visor holder unit, the holder portion and the base portion are preferably arranged and constructed to define a sun visor holder portion that releasably retains a sun visor retaining portion when the first arched attachment part and the second arched attachment part are folded along the hinge portion.

Additional representative examples of the present teachings will be described in further detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the above detail description may not be necessary to practice the invention in the broadest sense, and are instead taught merely to particularly describe some representative examples of the invention. In addition, the present teachings naturally may be combined in ways that are not specifically enumerated in order to provide additional useful embodiments of the present teachings.

Two detailed representative embodiments of the present teachings are shown in FIGS. 1 to 14(C), in which holder units of vehicle sun visors are described as representative examples of attachment devices that can be prepared utilizing the present teachings.

Before describing these two representative embodiments in further detail, however, a brief explanation of a representative use or application of the two representative embodiments will be provided. As shown in FIG. 1, a vehicle sun visor 1 is mounted on a vehicle panel or front header panel 40 by a mounting bracket 2. As will be appreciated, the bracket 2 is rotatably coupled to an L-shaped metal support arm 3 of the sun visor 1. Moreover, a representative sun visor holder unit 10 is attached to the front header panel 40 in order to rotatably and removably support a retainer portion 1a of the sun visor 1. Preferably, the holder unit 10 may be first attached to a panel lining sheet 50 and then the joined holder unit 10 and the panel lining sheet 50 are attached to the front header panel 40. As will be apparent, the panel lining sheet 50 and the front header panel 40 are previously formed with a receiving hole 51 and a mounting hole 41, respectively.

First Detailed Representative Embodiment

Figure 2:
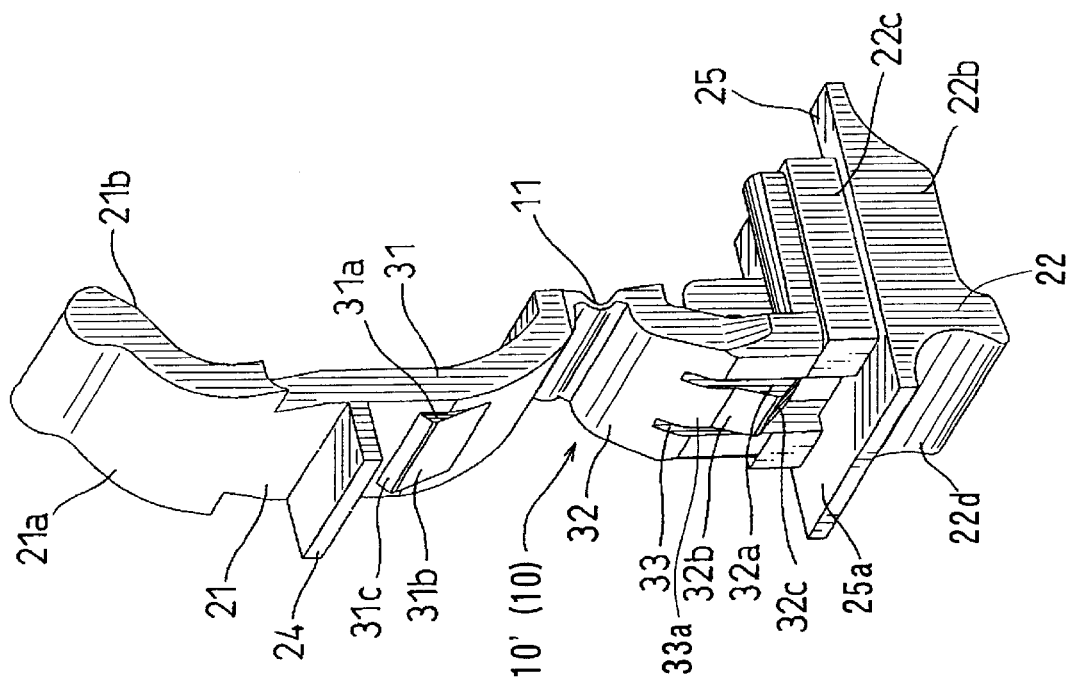
FIG. 2 is a perspective view of a first representative sun visor holder unit according to the present teachings.
Figure 3:
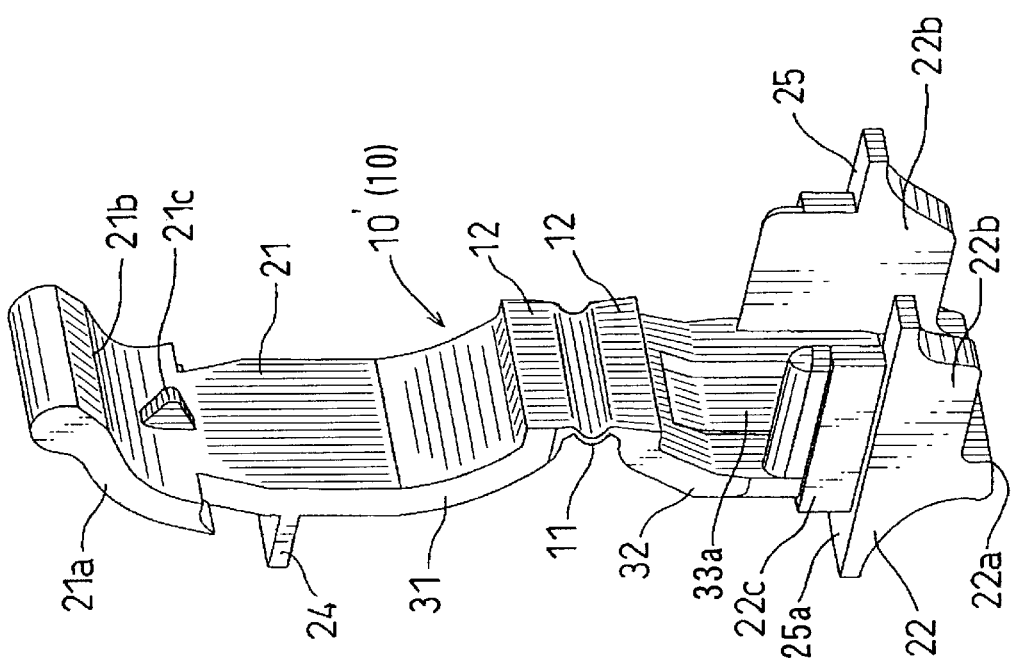
FIG. 3 is another perspective view of the first representative sun visor holder unit of FIG. 2.
Figure 4:
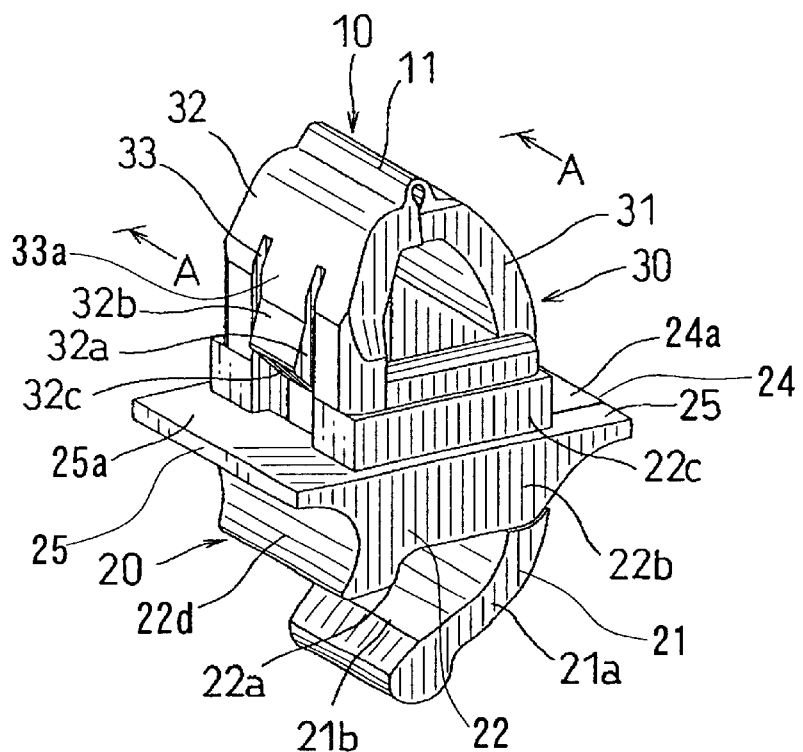
FIG. 4 is a perspective view of the first representative sun visor holder unit of FIG. 2.
Figure 5:
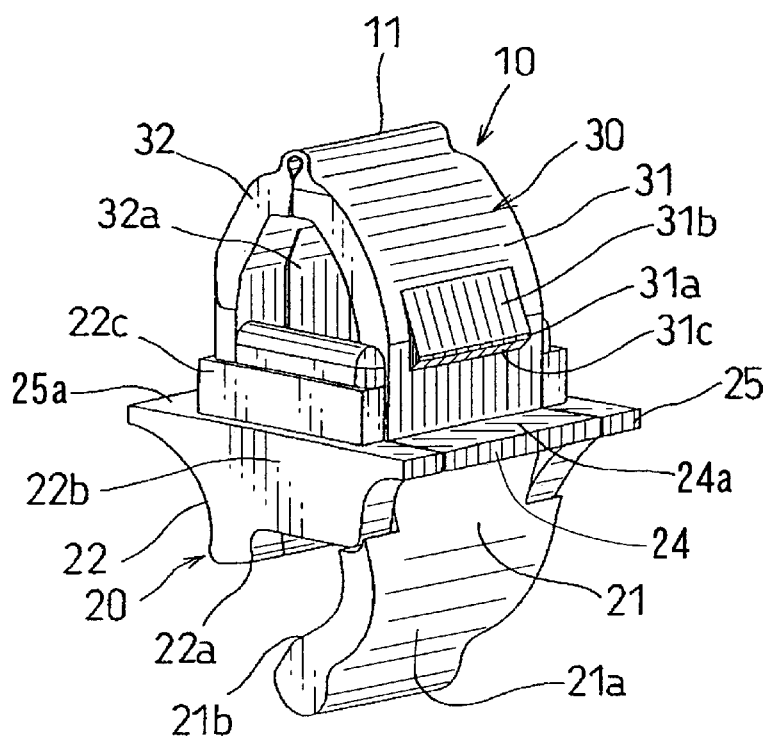
FIG. 5 is another perspective view of the first representative sun visor holder unit of FIG. 2.
Figure 6:
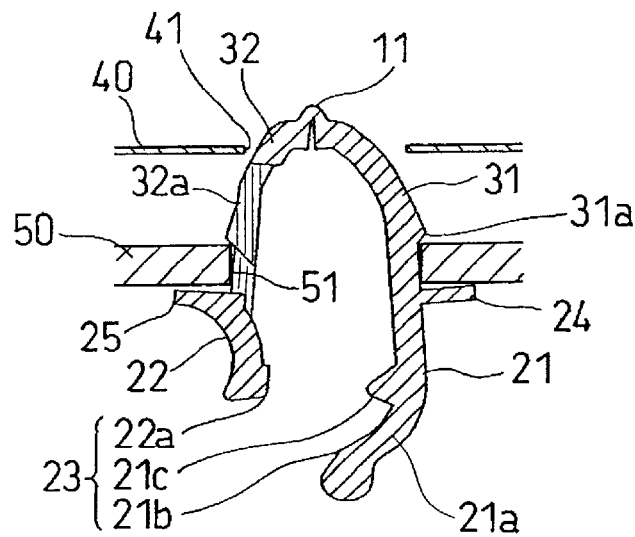
FIG. 6(A) is a cross-sectional view taken along line A—A of FIG. 4 before an attachment portion is inserted into a mounting hole of the front header panel.
FIG. 6(B) is a cross-sectional view taken along line A—A of FIG. 4 while the attachment portion is being pressed into the mounting hole of the front header panel.
FIG. 6(C) is a cross-sectional view taken along line A—A of FIG. 4 after the attachment portion has been completely inserted into the mounting hole of the front header panel.
FIG. 6(D) is a cross-sectional view similar to FIG. 6(C), illustrating a condition in which a sun visor retainer portion is engaged with a holder portion.
Figure 6:
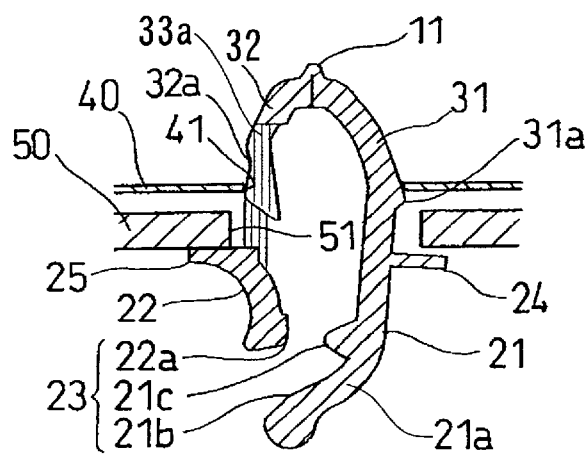
Figure 6:
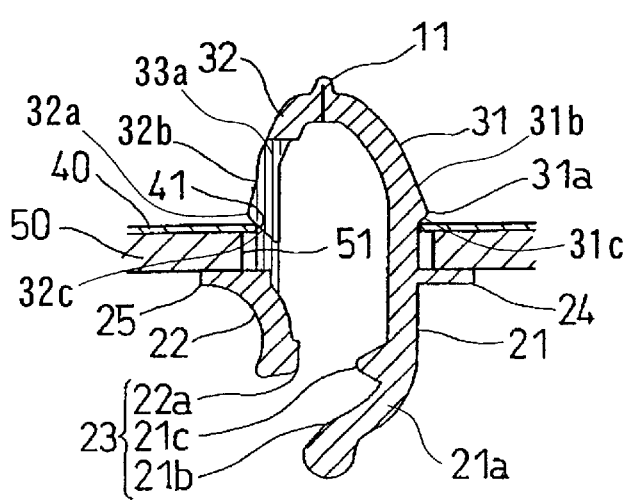
Figure 6:
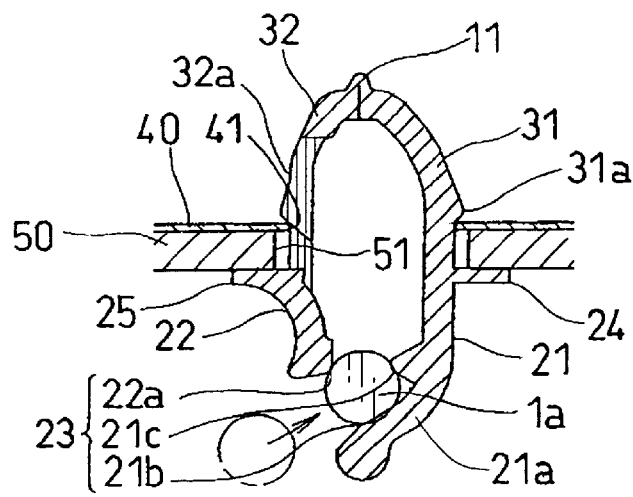
Figure 7:
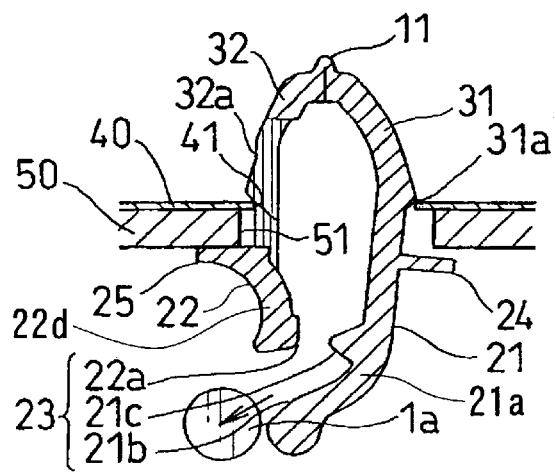
FIG. 7(A) is a cross-sectional view similar to FIG. 6(B), illustrating an initial step for removing the attachment portion from the mounting hole of the front header panel.
FIG. 7(B) is a cross-sectional view similar to FIG. 6(B), illustrating a final step for removing the attachment portion from the mounting hole of the front header panel.
Figure 7:
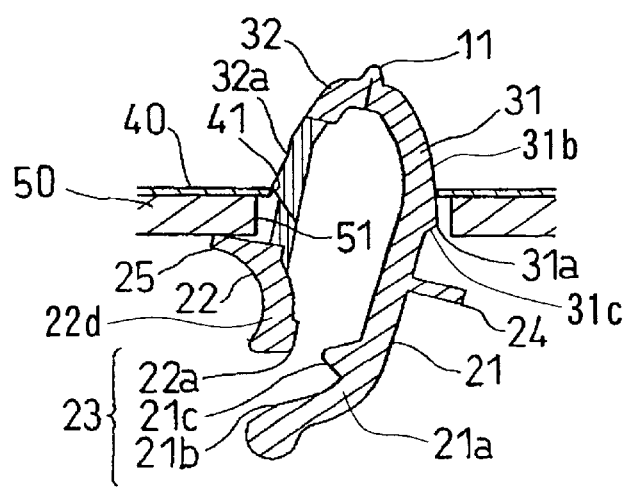
Figures 8, 9:
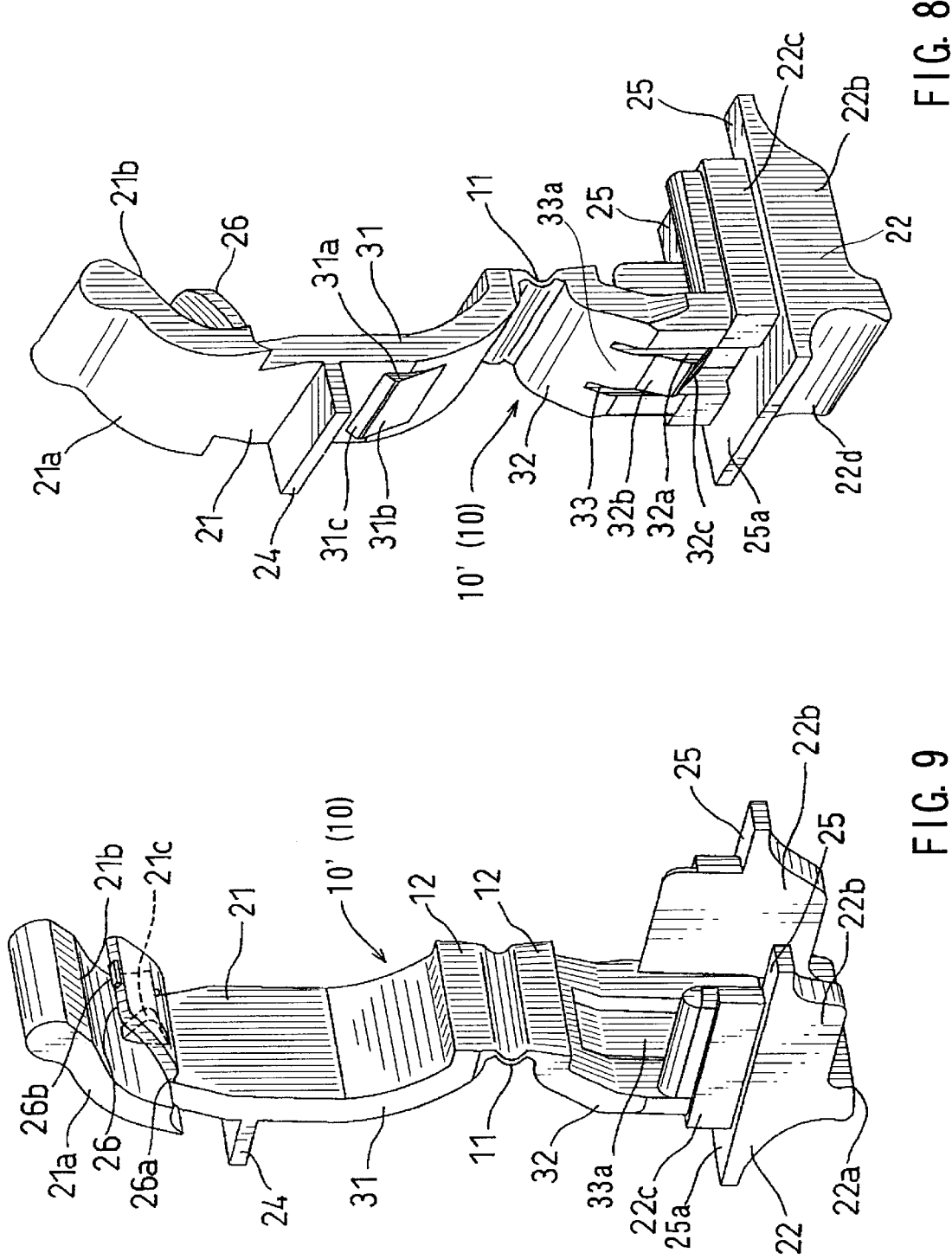
FIG. 8 is a perspective view of a second representative sun visor holder unit according to the present teachings.
FIG. 9 is another perspective view of the second representative sun visor holder unit of FIG. 8.
Figure 10:
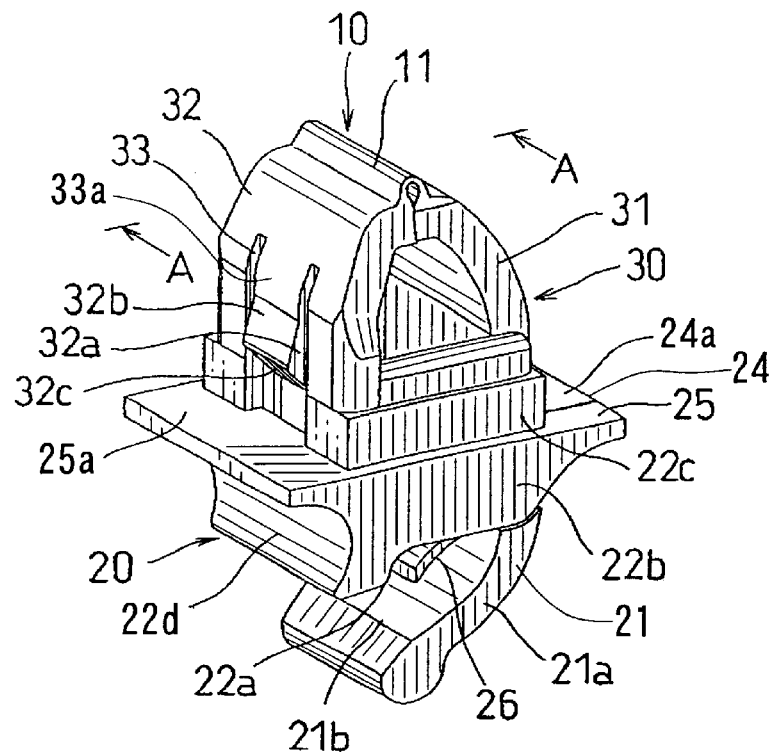
FIG. 10 is another perspective view of the second representative sun visor holder unit of FIG. 8.
Figure 11:
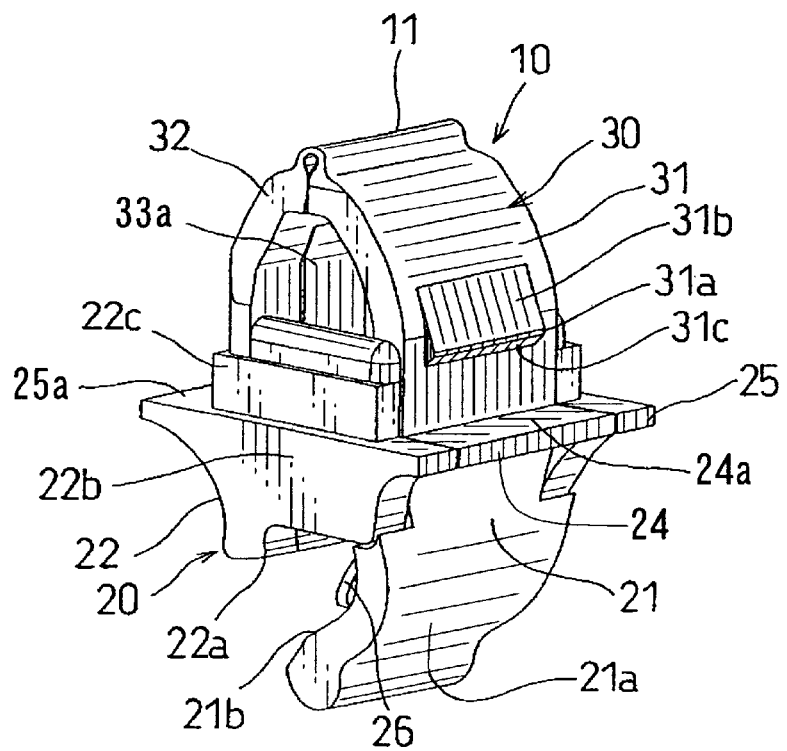
FIG. 11 is another perspective view of the second representative sun visor holder unit of FIG. 8.
Figure 12:
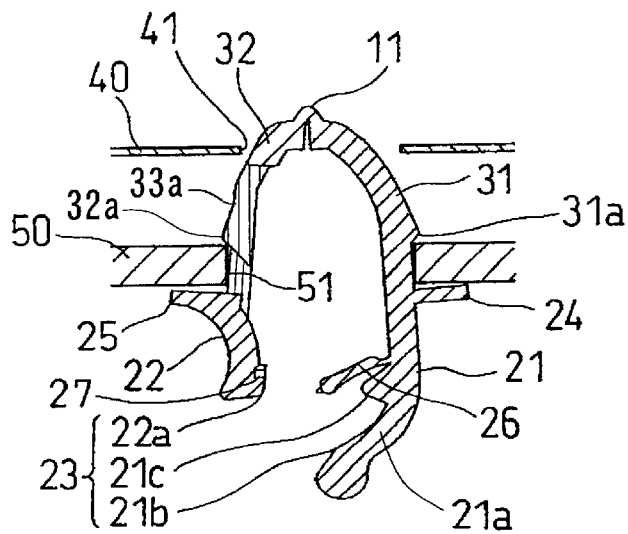
FIG. 12(A) is a cross-sectional view taken along line A—A of FIG. 10 before an attachment portion is inserted into a mounting hole of a front header panel.
FIG. 12(B) is a cross-sectional view taken along line A—A of FIG. 10 while the attachment portion is being pressed into the mounting hole of the front header panel.
FIG. 12(C) is a cross-sectional view taken along line A—A of FIG. 10 after the attachment portion has been completely inserted into the mounting hole of the front header panel.
FIG. 12(D) is a cross-sectional view similar to FIG. 12(C), illustrating a condition in which a sun visor retainer portion is engaged with a holder portion.
Figure 12:
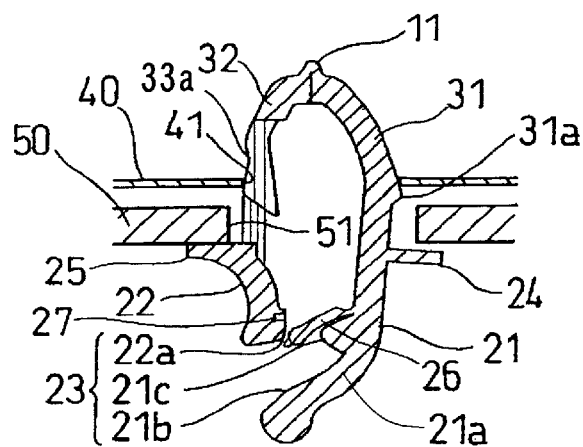
Figure 12:
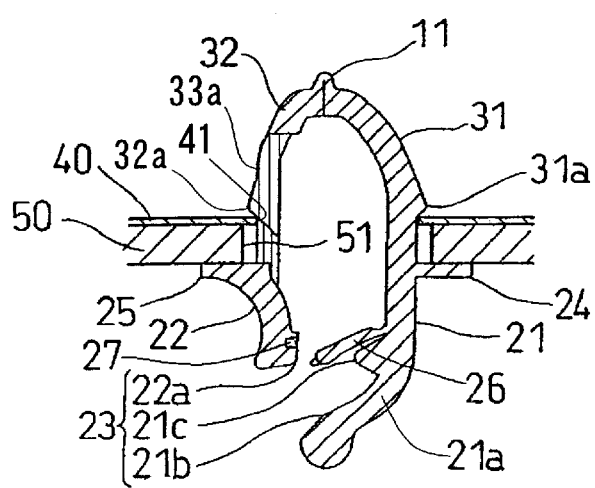
Figure 12:
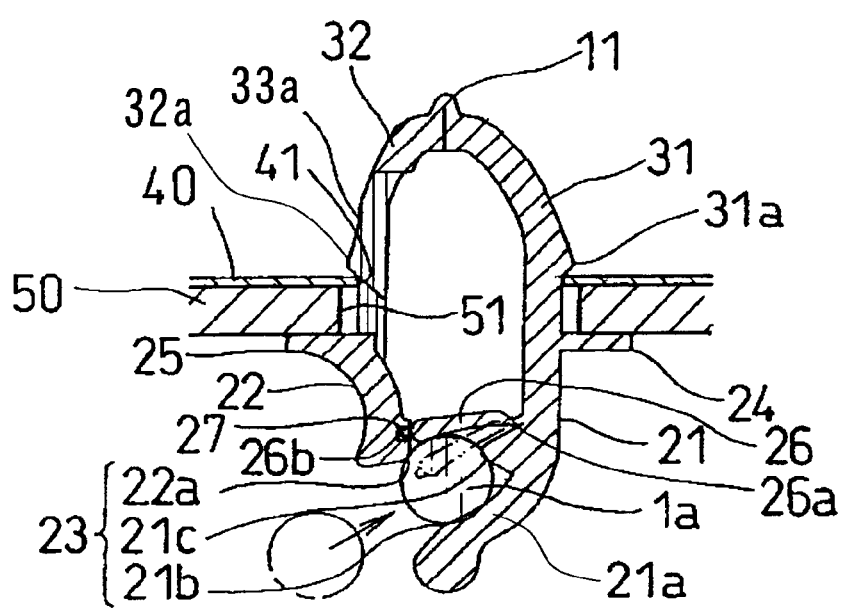
Figure 13:
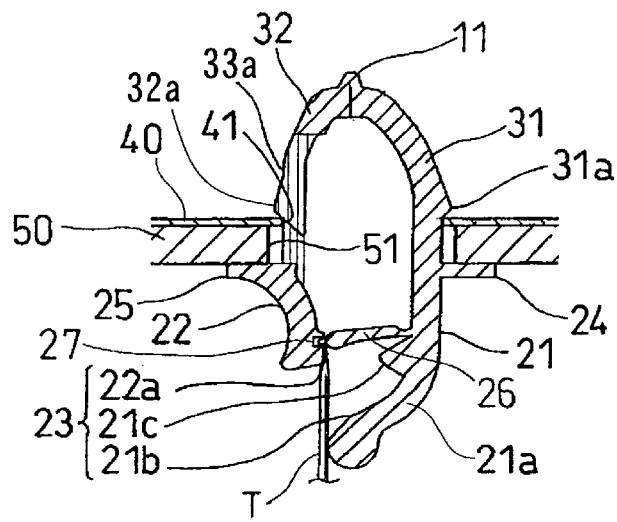
FIG. 13(A) is a cross-sectional view similar to FIG. 12(D), illustrating an initial step for removing the attachment portion from the mounting hole of the front header panel.
FIG. 13(B) is a cross-sectional view similar to FIG. 12(B), illustrating an intermediate step for removing the attachment portion from the mounting hole of the front header panel.
FIG. 13(C) is a cross-sectional view similar to FIG. 12(B), illustrating a final step for removing the attachment portion from the mounting hole of the front header panel.
Figure 13:
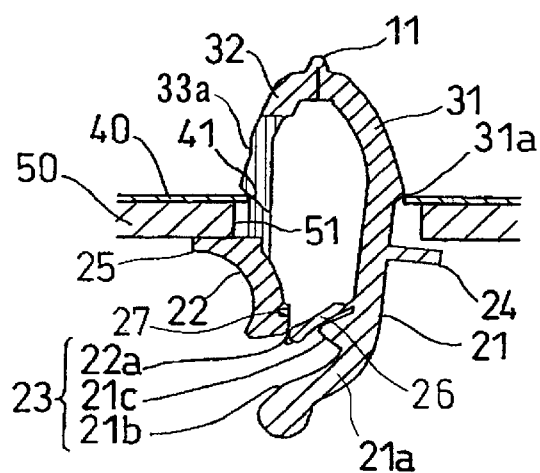
Figure 13:
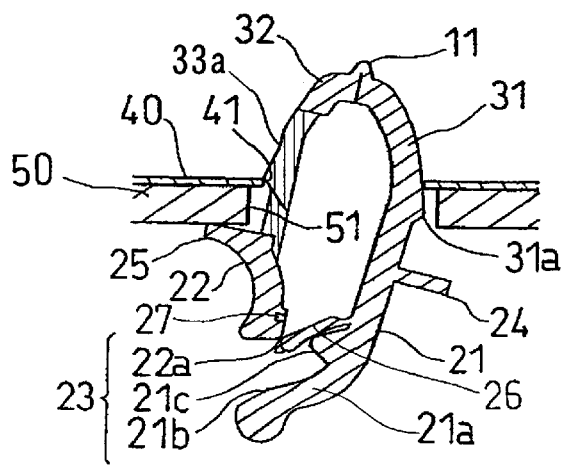

The first detailed representative embodiment will now described in detail with reference to FIGS. 1 to 7(B), in which a sun visor holder unit 10 is described as a representative attachment device according to the present teachings. As shown in FIGS. 4 and 5, the sun visor holder unit 10 may include an arched or U-shaped attachment member or attachment portion 30 that is adapted to be inserted into the mounting hole 41 of the panel 40. A holder member or holder portion 20 is also provided and is adapted to hold or retain the sun visor retainer portion 1a. As shown in FIGS. 2 and 3, the sun visor holder unit 10 may be produced by assembling or folding an elongated unit or blank 10'. The blank 10' may be manufactured, for example, by injection molding a resin material.

The attachment portion 30 may include, for example, a first arcuate attachment part 31 and a second arcuate attachment part 32. The distal ends of the parts 31, 32 may be elastically connected by a relatively thin portion 11, which may serve as a hinge. Preferably, the parts 31, 32 can flex or deform relative to each other around the hinge 11 when the parts 31, 32 are inwardly pressed. Each inner distal end of the parts 31, 32 preferably includes a vertical mating surface 12, as shown in FIG. 3. The mating surfaces 12 are disposed adjacent to each other.

The holder portion 20 preferably includes a first or base part 22 and a second or holding part 21, which may serve as a manipulating means according to the present teachings. The holding part 21 and the base part 22 of the holder portion 20 are separate from each other and therefore can move relative to each other. Further, the holding part 21 and the base part 22 are operatively connected to the attachment parts 31, 32, respectively. As a result, the attachment parts 31, 32 can be elastically flexed by moving the parts 21, 22 relative to each other. In other words, by inwardly pressing the holding and base parts 21, 22, the attachment parts 31, 32 will flex or deform and will move inwardly relative to each other.

An engagement projection 31a is disposed on an outer surface of the first attachment part 31. The projection 31a has a substantially triangular cross-sectional shape and has an upper inclined surface 31b and a lower inclined surface 31c. Further, the second attachment part 32 has a U-shaped omitted portion (recess) 33, to thereby form a flexible strip 33a. An outwardly projecting engagement projection 32a is disposed at the lower end of the flexible strip 33a, which projection 32a is positioned to substantially correspond to the projection 31a of the first attachment part 31. The projection 32a also has a substantially triangular cross-sectional shape and has an upper inclined surface 32b and a lower inclined surface 32c. For example, one or both of the engagement projections 31a, 32b may be a cantilevered structure attached to the respective first and second attachment parts 31, 32.

Preferably, the outer distance between the engagement projections 31a, 32a is greater than the width of the mounting hole 41 of the front header panel 40 when these attachment parts 31, 32 are in a first or non-operational condition, as shown in FIG. 6(A). In the non-operational condition of the attachment parts 31, 32, the mating surfaces 12 preferably do not completely contact each other, so that the attachment portion 30 has a slightly spread U-shape. Therefore, when the attachment portion 30 is pressed into the mounting hole 41 of the panel 40, the upper inclined surfaces 31b, 32b of the projections 31a, 32a can contact the periphery of the mounting hole 41. Thus, as shown in FIG. 6(B), the attachment part 31 and the flexible strip 33a will inwardly flex or deform and the attachment portion 30 can be introduced into the mounting hole 41 while elastically inwardly flexing the first attachment part 31 and the flexible strip 33a. When the attachment portion 30 is completely inserted, the attachment parts 31, 32 will outwardly restore due to the spring-like force of these parts 31, 32. Therefore, the lower inclined surfaces 31c, 32c of the projections 31a, 32a will engage the periphery of the mounting hole 41 due to the restoring forces of the attachment part 31 and the flexible strip 33a, to thereby secure the attachment portion 30 to the panel 40. When the attachment parts 31, 32 are thus positioned in the second or operational condition, the attachment portion 30 has a substantially U-shape that is slightly narrower than in the non-operational condition of the attachment parts 31, 32, as shown in FIG. 6(C).

As was described above, the base part 22 and the holding part 21 of the holder portion 20 are joined to the proximal ends of the attachment parts 32, 31, respectively. The base part 22 may comprise a base body 25 that has a U-shaped form in plan view and has a U-shaped upper flat surface 25a, which surface 25a is connected to the proximal end of the attachment part 32. Also, the base part 22 may further include side walls 22b and a front wall 22d that downwardly extend from the base body 25. A space is defined between the walls 22b, 22d, which space rearwardly opens. The front wall 22d has a thickened lower end 22a that extends downwardly further than the lower ends of the side walls 22b. In addition, the base body 25 includes a pair of stopper bars 22c that are disposed on the upper surface 25a in such a way as to substantially align with the side walls 22b. These stopper bars 22c are adapted to contact the front header panel 40 when the attachment portion 30 is pushed into the mounting hole 41. Therefore, the attachment portion 30 is prevented from excessively projecting into the mounting hole 41 of the front header panel 40. Further, each of these stopper bars 22c preferably has a thickness substantially equal to or slightly less than the thickness of the lining sheet 50.

The holding part 21 may include a base plate 24 that has an upper flat surface 24a, which surface 24a is connected to the proximal end of the attachment part 31. A strip-like hook 21a downwardly extends from the base plate 24. The base plate 24 is movably received within the rearwardly opened space. Therefore, the holding part 21 can move relative to the base part 22, so as to flex or inwardly squeeze the attachment parts 31, 32 relative to each other. In addition, the base plate 24 is preferably arranged in such a way that the upper surface 24a is coplanar, or substantially coplaner, with the upper surface 25a of the base body 25 of the base part 22 when the attachment parts 31, 32 are in the operational condition, as shown in FIG. 6(C).

The hook 21a includes a thickened lower end 21b. A stopper projection 21c is disposed on the inner surface of the hook 21a. The lower end 21b and the stopper projection 21c cooperate with the front wall lower end 22a, to thereby define a sun visor holding portion 23 that can receive the sun visor retainer portion 1a.

Further, the mounting hole 41 of the front header panel 40 preferably has a rectangular configuration, which substantially corresponds to the cross section of the attachment portion 30. However, it is to be noted that the mounting hole 41 also may have any appropriate dimension that is smaller than the dimensions of the attachment portion 30. Moreover, although the receiving hole 51 of the panel lining sheet 50 also preferably has a rectangular configuration, any appropriate dimension may be utilized. In addition, the receiving hole 51 is preferably larger than the mounting hole 41. In that case, the engagement projections 31a, 32a can easily engage the receiving hole 51 without substantial flexure of the attachment part 31 and the flexible strip 33a, as shown in FIG. 6(A).

A representative method for attaching the representative sun visor holder unit 10 to the front header panel 40 will now be described with reference to FIGS. 6(A) to 6(D).

First, the sun visor holder unit 10 is positioned against the panel lining sheet 50 in such a way that the attachment portion 30 aligns with the receiving hole 51. Thereafter, as shown in FIG. 6(A), the attachment portion 30 is inserted into the receiving hole 51, so that the engagement projections 31a, 32a engage the periphery of the receiving hole 51. In this state, the sun visor holder unit 10 is loosely attached to the panel lining sheet 50. Moreover, the attachment parts 31, 32 are in the non-operational condition in this state, so that the attachment portion 30 has a slightly spread U-shape.

Subsequently, the combination of the panel lining sheet 50 and the sun visor holder unit 10 is placed or overlaid on the front header panel 40 in such a way that the attachment portion 30 aligns with the mounting hole 41, as shown in FIG. 6(A). Thereafter, the attachment portion 30 is pressed toward the front header panel 40. At this time, as shown in FIG. 6(B), the upper inclined surfaces 31b, 32b of the projections 31a, 32a contact the periphery of the mounting hole 41, to thereby inwardly flex or deform the attachment part 31 and the flexible strip 33a. As a result, the attachment portion 30 is introduced into the mounting hole 41 while elastically inwardly flexing the attachment part 31 and the flexible strip 33a.

Thereafter, as shown in FIG. 6(C), the attachment portion 30 is further pressed until apices of the projections 31a, 32a pass through the mounting hole 41. As a result, the attachment part 31 and the flexible strip 33a will outwardly restore and the lower inclined surfaces 31c, 32c of the projections 31a, 32a will engage the periphery of the mounting hole 41 due to the restoring forces of the attachment part 31 and the flexible strip 33a. Thus, the attachment portion 30 can be secured to the panel 40. At this time, although not shown in FIG. 6(C), the stopper bars 22c, which are disposed on the base body upper surface 25a, contact the front header panel 40. Thus, the sun visor holder unit 10 is reliably attached to the front header panel 40 and the lining sheet 50 is compressedly interleaved between the holding portion 20 and the front header panel 40. Further, at this time, the attachment parts 31, 32 are in the operational condition. That is, the attachment portion 30 assumes a substantially U-shape and the mating surfaces 12 contact each other under pressure.

The present sun visor holder unit 10 can be easily and reliably attached to the front header panel 40 without using special tools. If the sun visor holder unit 10 is attached as shown in FIG. 6(D), the holder portion 20 can hold the sun visor retainer portion 1a. That is, the sun visor holding portion 23 comprises the hook lower end 21b and the hook stopper projection 21c and the front wall lower end 22a can reversibly engage the sun visor retainer portion 1a by a snap-fit connection.

A representative method for detaching or removing the sun visor holder unit 10 from the front header panel 40 will now be described with reference to FIGS. 7(A) and 7(B).

First, the sun visor retainer portion 1a is disengaged from the sun visor holding portion 23. Subsequently, the holding part 21 and the base part 22 of the holder portion 20 are inwardly pressed, to thereby inwardly flex or deform (move) the first attachment part 31 against the second attachment part 32. Therefore, the lower inclined surface 31c of the projections 31a can be disengaged from the periphery of the mounting hole 41. As a result, the attachment portion 30 can be pulled out from the mounting hole 41 of the panel 40 and the sun visor holder unit 10 can be detached from the front header panel 40.

If the present sun visor holder unit 10 is attached to the panel 40, it can be easily detached from the panel 40 by simply inwardly squeezing the hook 21a of the holding part 21 and front wall 22d of the base part 22. That is, the sun visor holder unit 10 can be detached from the panel 40 without directly operating the attachment portion 30. As a result, the sun visor holder unit 10 can be easily removed from the panel 40 without using any tools.

The sun visor holder unit 10 according to the first representative embodiment may exhibit the following effects and advantages.

For example, in one embodiment, the present sun visor holder unit 10 can be easily attached to and detached from the panel 40 in one step. Therefore, time-consuming and labor intensive work is not necessary in order to attach or remove the sun visor holder unit 10.

In another preferred embodiment, because the holding part 21 and the base part 22 of the holder portion 20 may function as a manipulator or manipulating means, the design of the sun visor holder unit 10 can be remarkably simplified. Moreover, the sun visor holder unit 10 can be easily manufactured at a low cost, because it may be integrally formed by resin molding.

Various changes and modifications may be made to the present teachings without departing from the scope of the invention. For example, although the holding part 21 and the base part 22 of the holder portion 20 are used as the manipulating means in the first representative embodiment, additional members can be provided that are independent from these parts 21, 22 and may serve as the manipulating means.

Further, the engagement projection 31a can be formed on a flexible strip that is similar to the flexible strip 33a. In addition, although the first attachment part 31 can be substantially flexed in the first representative embodiment, the second attachment part 32 also can be designed to be flexible.

Second Detailed Representative Embodiment

A second representative embodiment of the present teachings is shown in FIGS. 8 to 13(C), which embodiment is related to the first representative embodiment. Therefore, only constructions that are different from the constructions described in the first representative embodiment will be explained. Further, parts that are the same as the first representative embodiment are identified by the same reference numerals in the second representative embodiment.

In the second representative embodiment, the hook 21a of the holding part 21 also includes a support member or strut plate 26. The strut plate 26 is arranged between the holding part 21 and the base part 22 of the holding portion 20, so as to be adjacent to the stopper projection 21c. A thinned portion 26a is provided along the proximal end of the strut plate 26 and the thinned portion 26a is connected to the inner surface of the hook 21a. For example, the strut plate 26 may be a cantilevered plate that is adapted to pivot up and down along its proximal end. In addition, a lock means or engagement projection 26b may be disposed on a distal end surface of the strut plate 26. Further, the strut plate 26 is normally disposed in a downwardly inclined position that corresponds to a first or non-functional position, as shown in FIGS. 12(A) to 12(C).

Further, a lock means or engagement groove 27 may be disposed on the thickened lower end 22a of the front wall 22d of the base part 22, as shown in FIGS. 12(A) to 13(C). The engagement groove 27 is adapted to engage the strut plate engagement projection 26b, so as to releasably retain the strut plate 26 between the hook 21a and the front wall 22d. Further, when the engagement projection 26b engages the engagement groove 27, the strut plate 26 is disposed in a substantially horizontal (parallel) position that corresponds to a second or functional position, as shown in FIGS. 12(D) and 13(A). That is, the strut plate 26 may be substantially parallel to the upper surface of the base portion 22 and the upper surface 24a of the first attachment part 31.

The second representative sun visor holder unit 10 may be attached to the front header panel 40 in substantially the same manner as the first representative embodiment. As shown in FIG. 12(C), after the holder unit 10 is attached to the panel 40 and before the sun visor retainer portion 1a is engaged within the sun visor holding portion 23, the strut plate 26 is still in the non-functional position. However, as shown in FIG. 12(D), the sun visor retainer portion 1a is then introduced into the sun visor holding portion 23. The retainer portion 1a shifts the strut plate 26 from the non-functional position to the functional position, to thereby engage the engagement projection 26b with the engagement groove 27. As a result, the engagement projection 26b and the engagement groove 27 are connected and the strut plate 26 is retained in the horizontal (parallel) functional position. After being secured in the engagement groove 27, the strut plate 26 may prevent the holding part 21 from inwardly moving, which thereby prevents the first attachment part 31 from inwardly flexing, even if the sun visor retainer portion 1a is removed from the sun visor holding portion 23. That is, even if external forces are applied to the holding part 21, the first attachment part 31 will not inwardly flex. As a result, the attachment portion 30 can be reliably retained in the mounting hole 41 of the panel 40, regardless of whether the retainer portion 1a engages the sun visor holding portion 23 or not. Therefore, the holder unit 10 can be effectively prevented from dropping or falling out of the panel 40.

Further, the engagement projection 26b and the engagement groove 27 are designed in such a way that that once the engagement projection 26b and the engagement groove 27 are connected or coupled, the connection or coupling can not be released when the sun visor retainer portion 1a is introduced into or removed from the sun visor holding portion 23. In other words, after the engagement projection 26b and the engagement groove 27 have been connected or coupled, the connection or coupling can only be released by positively outwardly spreading the holding part 21.

Because the engagement projection 26b can be engaged with the engagement groove 27 by simply introducing the retainer portion 1a into the sun visor holding portion 23, additional tools are not necessary to engage the engagement projection 26b with the engagement groove 27. In addition, time-consuming and labor intensive work is not necessary.

The strut plate 26 may cover or close the inner space between the first and second attachment parts 31, 32. Therefore, the strut plate 26 may function as an ornamental member that may contribute to the improved appearance of the attached sun visor holder unit 10.

A representative method for detaching or removing the sun visor holder unit 10 of the second embodiment from the front header panel 40 will now be described with reference to FIGS. 13(A) to 13(C).

First, as shown in FIG. 13(A), after the retainer portion 1a is disengaged from the sun visor holding portion 23, the holding part 21 is outwardly spread, either manually or by using a tool such as a screwdriver, to thereby disengage the engagement portion 26b from the engagement groove 27. Thus, the strut plate 26 is released from the functional position and will move to the non-functional position due to elastic restoration, as shown in FIG. 13(B). As a result, the sun visor holder unit 10 can be detached or removed from the front header panel 40 in the same manner as the first representative embodiment, as shown in FIG. 13(C).

Naturally, various changes and modifications may be made to the present teachings without departing from the scope of the invention. For example, although the strut plate 26 is moved to the functional position by the sun visor retainer portion 1a in this representative embodiment, the strut plate 26 can be designed in such a way as to be manually moved or moved by other mechanical means to the functional position.

Further, in order to disengage the engagement portion 26b from the engagement groove 27, the strut plate 26 can be upwardly forced instead of outwardly spreading the holding part 21. Also, the position and the shape of the strut plate 26 can be appropriately changed, as required.

What is claimed is:

1. An apparatus adapted to attach an accessory member to a panel comprising:

an attachment portion adapted to elastically engage a mounting hole formed in the panel when the apparatus is disposed within the mounting hole, the attachment portion comprising a first attachment part and a second attachment part, wherein the first and second attachment parts are elastically connected to each other by a hinge, and means for manually manipulating the attachment portion comprising a first manipulating part and a second manipulating part, wherein the first and second manipulating parts are separate from each other and are connected to respective ends of the first and second attachment parts, and wherein the first and second attachment parts are flexed, deformed or moved relative to each other by inwardly moving the first and second manipulating parts coupled to respective ends of the first and second attachment parts, wherein the manual manipulating means is actuated to disengage the attachment portion from the mounting hole.

2. An apparatus as defined in claim 1, wherein the manual manipulating means further comprises a sun visor holder portion configured to receive a sun visor retainer portion.

3. An apparatus as defined in claim 1, wherein at least one of the first or second attachment parts comprises an engagement projection adapted to engage the mounting hole.

4. An apparatus as defined in claim 3, wherein at least one of the first or second attachment parts comprises an flexible strip and the at least one engagement projection is disposed on the flexible strip.

5. An apparatus as defined in claim 4, further comprising a support member that is adapted to prevent actuation of the manual manipulation means.

6. An apparatus as defined in claim 1, further comprising a support member disposed on the manual manipulating means, wherein the support member prevents actuation of the manual manipulating means in order to thereby prevent inward flexing of the first and second attachment parts.

7. An apparatus as defined in claim 6, wherein the support member is a strut plate disposed between the first and second manipulating parts, the strut plate preventing relative motion of the first and second manipulating parts in order to thereby prevent relative deformation of the first and second attachment parts.

8. An apparatus as defined in claim 7, wherein the strut plate can move from a non-functional position to a functional position, and wherein the strut plate prevents movement of the first and second manipulating parts relative to each other when the strut plate is moved to the functional position.

9. An apparatus as defined in claim 8, further comprising a means for locking the manual manipulating means, wherein the lock means releasably retains the strut plate in the functional position.

10. An apparatus as defined in claim 9, wherein the strut plate comprises a cantilevered plate connected to the manual manipulating means, and wherein the lock means comprises an engagement projection and an engagement groove that define a releasable connection between the cantilevered plate and the manipulating means.

11. An apparatus as defined in claim 10, wherein the manual manipulating means further comprises a sun visor holder portion configured to receive a sun visor retainer portion.

12. An apparatus as defined in claim 11, wherein at least one of the first or second attachment parts comprises an engagement projection adapted to engage the mounting hole, at least one of the first or second attachment parts comprises an flexible strip and the at least one engagement projection is disposed on the flexible strip and inwardly pressed.

13. An attachment device (10) having a substantially elongated, flexible, resin body comprising:
   a base portion (22) comprising a base body (25) having a substantially U-shape, an upper flat surface (25a), side walls (22b) and a front wall (22d), wherein a space is defined between the side walls (22b) and the front wall (22d),
   a first arched attachment part (31) having a first end and a second end, comprising a holder portion (21) extending from the first end, the holder portion (21) comprising a base plate (24) having an upper flat surface (24a) extending substantially perpendicularly from the first attachment part (31) and
   a second arched attachment part (32) having a first end and a second end, the first end of the second arched attachment part (32) extending from the upper flat surface (25a) of the base portion (22), wherein the second end of the first arched attachment part (31) and the second end of the second arched attachment part (32) are flexibly joined at a hinge portion (11), wherein the holder portion (21) is disposed within the space defined in the base portion (22) when the first arched attachment part (31) and the second arched attachment part (32) are folded along the hinge portion (11) and inward movement of the holder portion (21) relative to the base portion (22) causes the first arched attachment part (31) to flex, deform or move inwardly relative to the second arched attachment part (32).

14. An attachment device (10) as defined in claim 13, further comprising mating surfaces (12) defined on the respective inner surfaces of the first arched attachment part (31) and the second arched attachment part (32), wherein the respective mating surfaces (12) contact each other when the first arched attachment part (31) and the second arched attachment part (32) are folded along the hinge portion (11).

15. An attachment device (10) as defined in claim 14, further comprising a first engagement projection (31a) disposed on the outer surface of the first arched attachment part (31) and a second cantilevered engagement projection (32a) disposed on the outer surface of the second arched attachment part (32).

16. An attachment device (10) as defined in claim 15, further comprising at least two stopper bars (22c) disposed on the upper surface (25a) of the base portion (22).

17. An attachment device (10) as defined in claim 16, further comprising a cantilever strut plate (26) extending from an inner surface of the holder portion (21), an engagement projection (26b) extending from the strut plate (26) and a groove (27) defined within the base portion (22), wherein engagement of the engagement projection (26b) within the groove (27) releasably locks the strut plate (26) in a functional position.

18. An attachment device as defined in claim 17, wherein the holder portion (21) and the base portion (22) are arranged and constructed to define a sun visor holder portion (23) that releasably retains a sun visor retaining portion (1a) when the first arched attachment part (31) and the second arched attachment part (32) are folded along the hinge portion (11).

19. A method of removing the attachment device (10) of claim 13 from a mounting hole (41) formed in a panel (40) comprising:
   manipulating the attachment device (10) of claim 13 by inwardly pressing the holder portion (21) relative to the base portion (22) in order to inwardly flex, deform or move the first arched attachment part (31) relative to the second arched attachment part (32) and withdrawing the attachment device (10) from the mounting hole (41).

20. An apparatus (10) for use in attaching an accessory member (1) to a panel (40) comprising:
   means (30) for elastically engaging a mounting hole (41) formed in the panel (40) when the apparatus (10) is disposed within the mounting hole (41), the engaging means (30) comprising a first attachment part (31) elastically connected to a second attachment part (32) by a hinge portion (11); and
   means (20) for manipulating the engaging means (30), wherein inwardly squeezing the manipulating means (20) causes the first attachment part (31) to deform relative to the second attachment part (32) and to disengage the engaging means (30) from the mounting hole (41).

21. An apparatus (10) as defined in claim 20, wherein the manipulating means (20) further comprises a sun visor holder portion (23) configured to receive a sun visor retainer portion (1a).

22. An apparatus (10) as defined in claim 21, wherein at least one of the first or second attachment parts (31, 32) comprises an engagement projection (31a, 32a) adapted to engage the mounting hole (41).

23. An apparatus (10) as defined in claim 22, wherein at least one of the first or second attachment parts (31, 32) comprises an flexible strip (33a) and the engagement projection (31a, 32a) is disposed on the flexible strip (33a).

24. An apparatus (10) as defined in claim 23, wherein the manipulating means (20) comprises a first manipulating part (21) and a second manipulating part (22), wherein the first and second manipulating parts (21, 22) are separate from each other and are respectively connected to the first and second attachment parts (31, 32), and wherein the first and second attachment parts (31, 32) are flexed, deformed or moved relative to each other by inwardly moving the first and second manipulating parts (21, 22).

25. An apparatus (10) as defined in claim 24, further comprising a support member (26) that is adapted to prevent actuation of the engaging means (30).

26. An apparatus (10) as defined in claim 25, wherein the support member (26) is disposed on the manipulating means (20) and the support member (26) prevents actuation of the manipulating means (20) in order to thereby prevent actuation of the engagement means (30).

27. An apparatus (10) as defined in claim 26, wherein the support member (26) is a strut plate (26) disposed between the first and second manipulating parts (21, 22), the strut plate (26) preventing relative movement of the first and second manipulating parts (21, 22) in order to thereby prevent relative deformation of the engagement means (30).

28. An apparatus (10) as defined in claim 27, wherein the strut plate (26) can move from a non-functional position to a functional position, and wherein the strut plate (26) prevents movement of the first and second manipulating parts (21, 22) relative to each other when the strut plate (26) is moved to the functional position.

29. An apparatus (10) as defined in claim 28, further comprising a lock means (26b, 27) disposed on the manipulating means (20), wherein the lock means (26b, 27) releasably retains the strut plate (26) in the functional position.

30. An apparatus (10) as defined in claim 29, wherein the strut plate (26) comprises a cantilevered plate connected to the manipulating means (20), and wherein the lock means (26b, 27) comprises an engagement projection (26b) and an engagement groove (27) that define a releasable connection between the cantilevered plate and the manipulating means (20).

31. An apparatus (10) as in claim 20, wherein the manipulating means (20) comprises a first manipulating part (21) connected to the first attachment part (31) and a second manipulating part (32) connected to the second attachment part (32), and wherein inward movement of the first manipulating part (21) toward the second manipulating part (22) causes the first attachment part (31) to flex, deform or move relative to the second attachment part (32).

* * * * *